United States Patent [19]
Allen, Jr. et al.

[11] 3,732,725
[45] May 15, 1973

[54] METHOD AND APPARATUS FOR TESTING COMPRESSIVE STRENGTH OF CONCRETE AND THE LIKE

[75] Inventors: Fred W. Allen, Jr., Glastonbury; Rowland J. Kopf, Kenmore Apt. 3B, Lanning St., Southington; Royal W. Thompson, Glastonbury, all of Conn.

[73] Assignee: said Kopf, by said Allen and Thompson

[22] Filed: Feb. 18, 1971

[21] Appl. No.: 116,676

Related U.S. Application Data

[63] Continuation of Ser. No. 834,945, June 20, 1969, abandoned, which is a continuation-in-part of Ser. No. 669,417, Sept. 21, 1967, abandoned.

[52] U.S. Cl. ..............................73/81, 73/85, 227/9
[51] Int. Cl. ................................................G01n 3/42
[58] Field of Search.............................85/10 E, 10 R; 227/8, 9, 11; 73/81, 82, 85, 94, 141 R, 88 C

[56] References Cited

UNITED STATES PATENTS

| | | | |
|---|---|---|---|
| 880,991 | 3/1908 | VonHassel | 73/82 |
| 3,038,159 | 6/1962 | Helderman | 227/8 |
| 2,675,546 | 4/1952 | Catlin et al. | 85/10 E |
| 3,348,751 | 10/1967 | Henning | 227/8 |
| 2,719,300 | 10/1955 | Walker | 227/8 |
| 2,767,575 | 10/1956 | Anderson | 73/141 R |
| 2,796,760 | 6/1957 | Warlam | 73/82 |
| 881,047 | 3/1908 | Ballentine | 73/82 |

FOREIGN PATENTS OR APPLICATIONS

| | | | |
|---|---|---|---|
| 1,139,996 | 11/1962 | Germany | 73/88 C |
| 1,028,377 | 2/1953 | France | 85/10 E |
| 214,196 | 6/1968 | U.S.S.R. | 73/81 |

*Primary Examiner*—Jerry W. Myracle
*Attorney*—Baldwin, Egan, Walling & Fetzer

[57] ABSTRACT

The mechanical probing of conglomeritic materials such as concrete for the determination of compressive strength involves the driving of one or more probes into the subsurface of the material under controlled conditions, to a depth below the shear cone inherent in the form of tension failure resulting from internal stresses caused by the probe penetration, and measuring the probe penetration which can be calibrated as reflective of the subsurface compaction and expressed in pounds per square inch compressive strength. Said probe penetration breaks the coarse ingredients of the conglomerate mass and rearranges the subsurface material into a compression stressed bulb. For more exact results the hardness of the coarse ingredients, in the form of the Moh's Scale rating is factored into the calibration process. Surface hardness and/or condition is unrelated to the resultant compaction bulb of the conglomerate mass and is disregarded. Preferably, three triangularly spaced probes are used for greater accuracy and measuring is done in such a way as to get a mechanical average of the penetration of the three probes and a coefficient of variation indication. For a given set of tests, and for most accurate results, all conditions are accurately controlled such as dimensions and hardness of the probe, the force effective to drive the probe including the powder charge, distance from the cartridge to a separable probe driving head, and clearance between the driving head and the bore, and uniform diameter of the probe driving head and the gun barrel bore.

11 Claims, 18 Drawing Figures

PATENTED MAY 15 1973

INVENTORS
FRED W. ALLEN JR.
ROWLAND J. KOPF
ROYAL W. THOMPSON
BY

Baldwin, Egan, Walling & Fetzer
ATTORNEYS

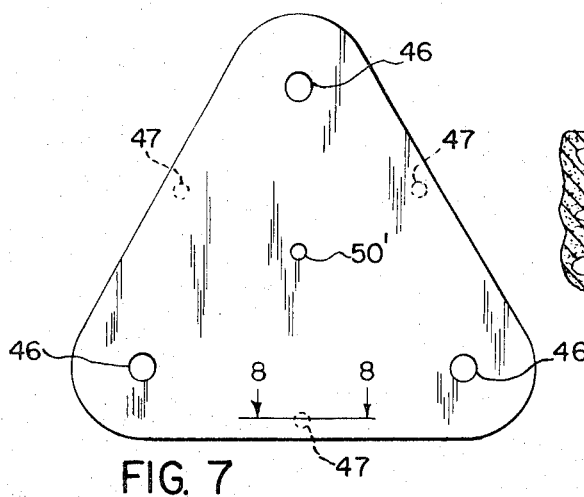
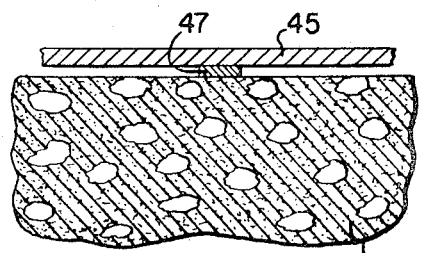
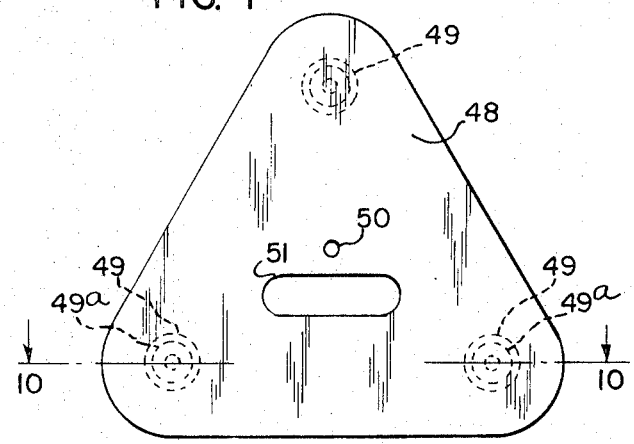
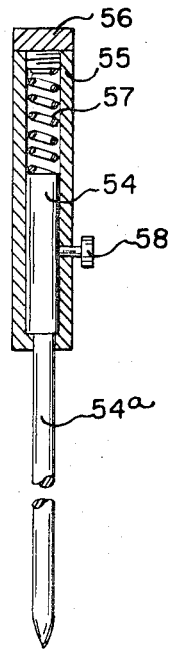
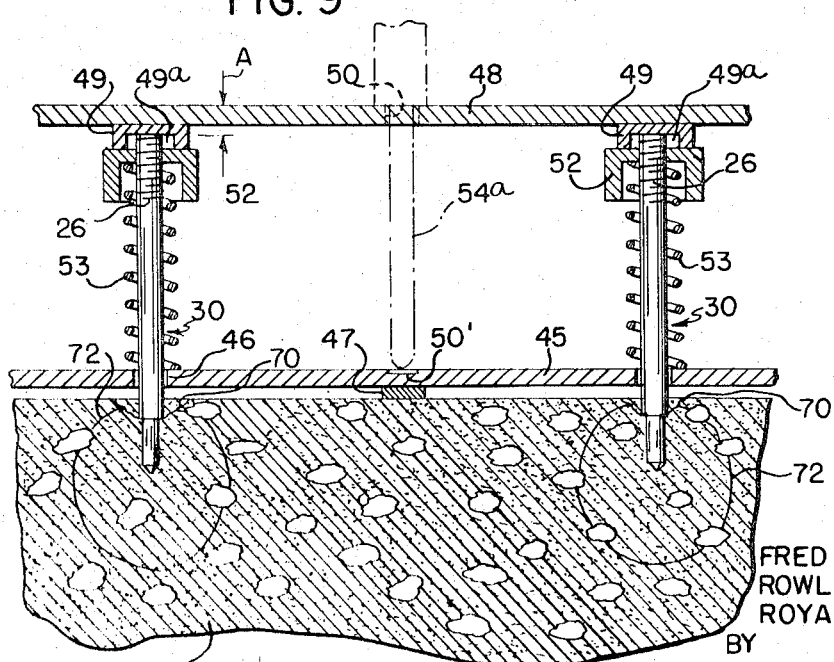

INVENTORS
FRED W. ALLEN JR.
ROWLAND J. KOPF
ROYAL W. THOMPSON
BY
Baldwin, Egan, Walling & Fetzer
ATTORNEYS

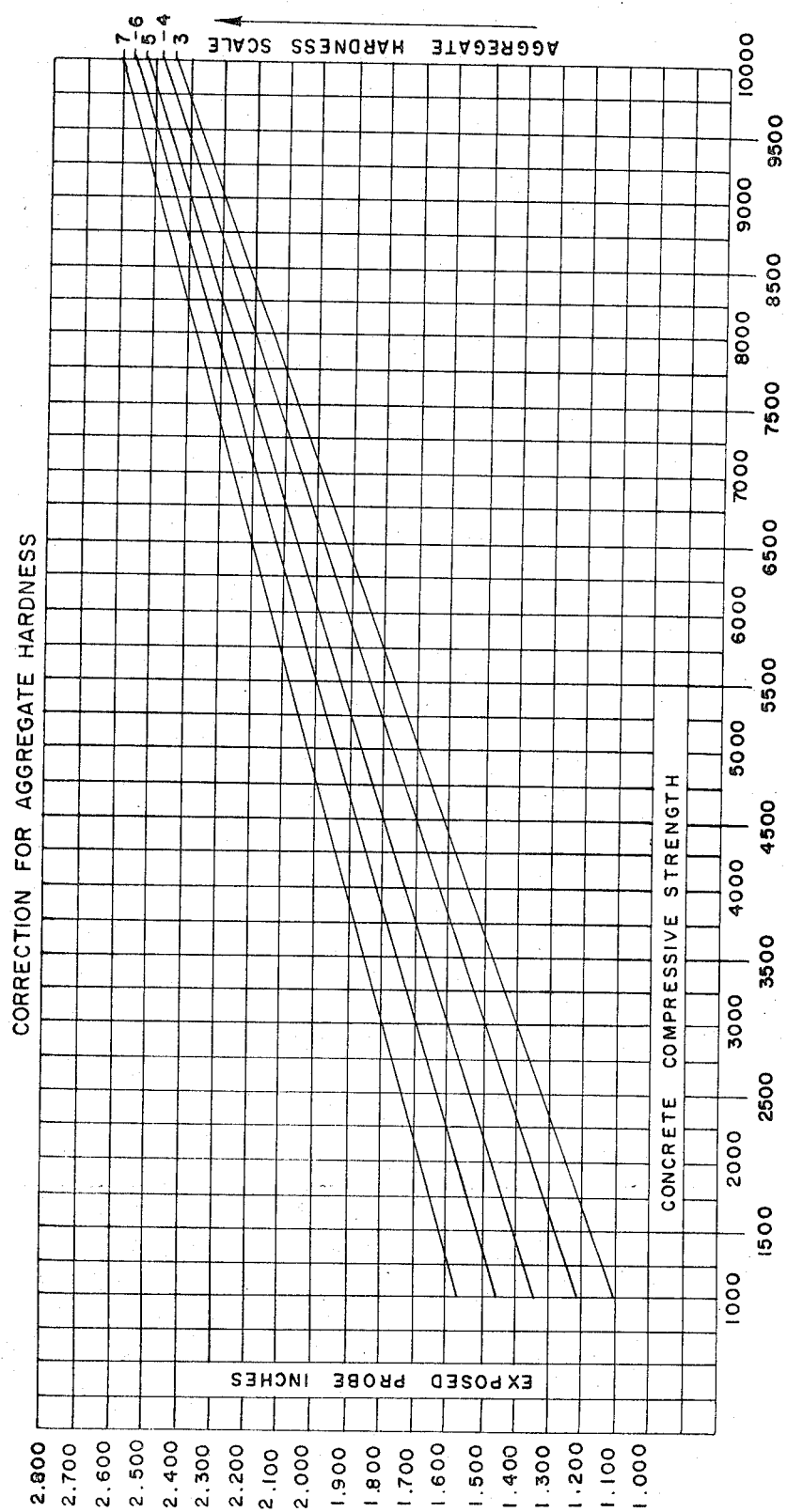

METHOD AND APPARATUS FOR TESTING COMPRESSIVE STRENGTH OF CONCRETE AND THE LIKE

This application is a continuation of Ser. No. 834,945, filed June 20, 1969 now abandoned, which is a continuation-in-part application of our application Ser. No. 669,417, filed Sept. 21, 1967, now abandoned.

This invention relates to a mechanical probing system and apparatus thereof for determining the compressive strength of conglomeritic materials such as described herein as applied to concrete.

One of the objects of this invention is to provide an accurate and improved method of testing the compressive strength of concrete after setting comprising the driving of a probe of substantially uniform physical dimensions and structure into the concrete or other material to be tested using a predetermined substantially uniform force, and thereafter measuring a subsurface physical condition (compaction) resulting from the resistance of the material to displacement by the probe entry, as a measure of the compressive strength of the concrete which is tested.

A preferred apparatus for carrying out this method comprises a powder actuated firing device of a type heretofore known for the setting of fastener devices, together with a probe of a preferred construction adapted to be fired from such a device into the concrete to be tested.

The invention includes details of the preferred probe for carrying out this invention and various means for measuring the physical condition resulting from the driving of the probe into the concrete as for measuring the compressive strength of the concrete.

Other objects and advantages of this invention will be apparent from the accompanying drawings and description and the essential features thereof will be set forth in the appended claims.

In the drawings,

FIG. 7 is a top plan view of a gauge base plate for arriving at a determination of the average depth of penetration of three probes driven by the use of the template of FIG. 3;

FIG. 8 is a fragmental sectional view along the line 8—8 of FIG. 7 showing how the gauge base plate is positioned on the concrete being tested;

FIG. 9 is a top plan view of a gauge top plate for use in combination with the base plate shown in FIG. 7;

FIG. 10 is a sectional view showing the use of the gauge plates of FIGS. 7 and 9 used in connection with three driven probes, the position of this view being shown by the section line 10—10 in FIG. 9;

FIG. 11 is a sectional view through a measuring rod for use with the gauge plates of FIGS. 7 and 9;

FIG. 17 is a similar diagrammatic view showing a completely driven probe whose nose is surrounded by crushed concrete herein called "compression stressed bulb"; while FIG. 18 is a graph showing how to modify the compressive strength indicated by exposed length of a probe driven into concrete according to the hardness of the aggregate in the concrete.

Figures 1, 2, 3:
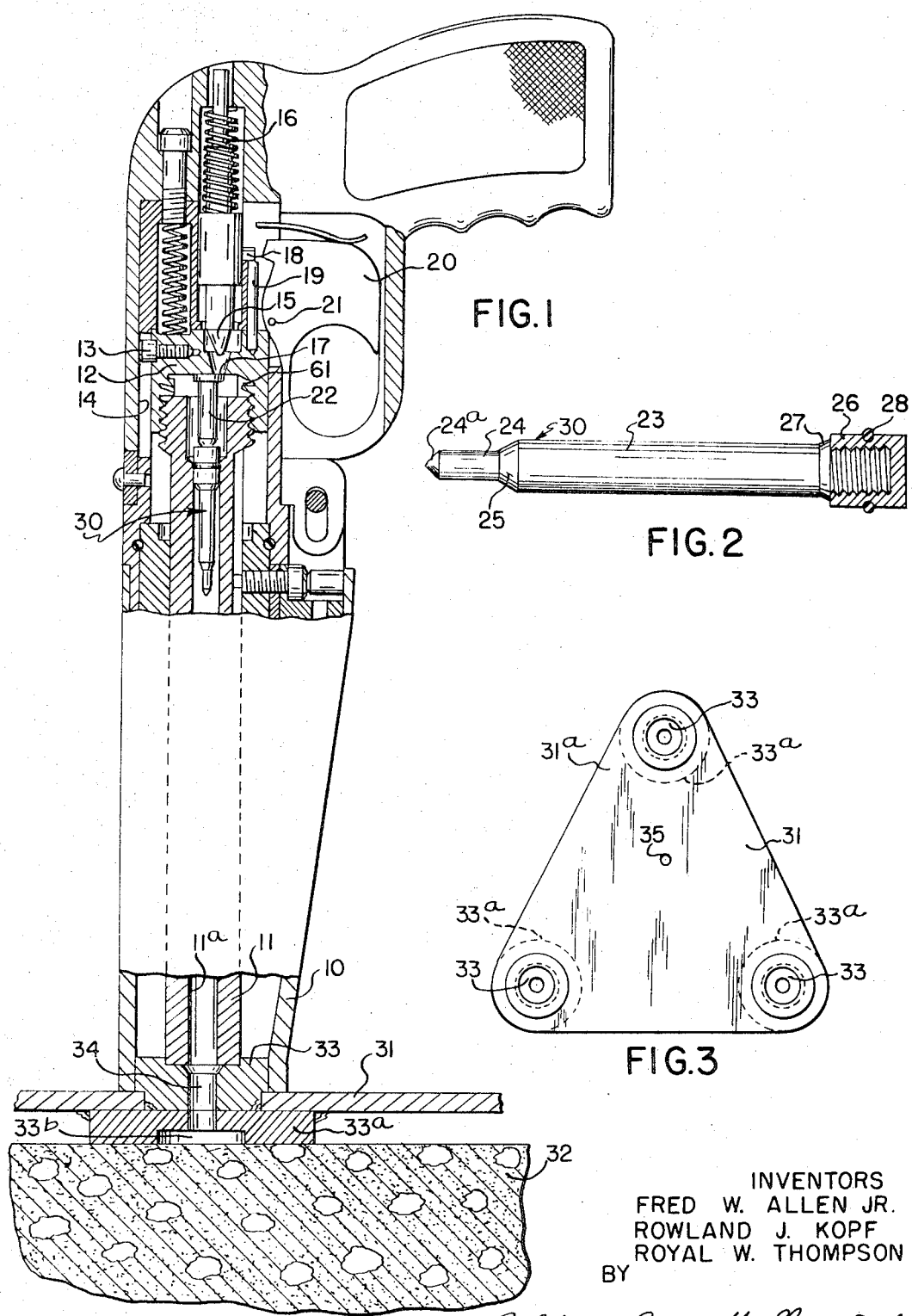
FIG. 1 is a side elevational view, partly broken away in section, of a powder actuated firing device which may be used in carrying out the present invention.
FIG. 2 is an elevational view of a probe, enlarged, capable of being used in the device of FIG. 1 for carrying out the present invention.
FIG. 3 is a top plan view of a template useful in spacing a plurality of probes of this invention in carrying out the method thereof.

A preferred device for driving the probe of this invention with a predetermined substantially uniform force into the concrete to be tested is shown in FIG. 1. It should be understood that many powder actuated firing devices might be used but the one shown here is like that illustrated and claimed in U.S. Pat. No. 2,945,236, granted July 19, 1960 to Rowland J. Kopf et al. Reference may be had to that patent if a more detailed description is desired than that presented here. It is believed that the only parts necessary for the understanding of this invention are as follows. A housing 10 open at its front end embraces a barrell 11 which is secured to a breech block 12. Means is provided mounting the breech block and its attendant barrel with the housing permitting relative axial movement in the housing bore but preventing radial movement. The connection is by way of breech block screw 13 which has its head traveling in an axially extending slot 14 of the firing mechanism housing. A firing pin 15 is reciprocatably mounted in the housing behind the breech block and resiliently biased by spring 16 to move toward the breech block in the same general axial direction and to align with the firing pin hole 17 in the breech block. The firing pin has a depressable pawl 18 movable crosswise of the direction of firing pin movement and normally urged outwardly to the position shown in FIG. 1 by a spring not shown. A cocking rod 19 carried by the breech block is normally out of contact with the pawl 18 when the barrel 11 extends forwardly out the open front end of the housing 10. As the barrel 11 is pushed up into the housing in the position of FIG. 1, as later described, the cocking rod 19 pushes the pawl 18 to the position shown in FIG. 1 where it is capable of actuation by a trigger 20 which is pivotally mounted in the housing at the point 21. As will be readily understood, with the parts in the position of FIG. 1, actuation of the trigger 20 will depress the pawl 18 thus releasing the firing pin 15 which moves forward under the influence of spring 16 to strike the primer and explode the powder in the cartridge case 22 previously positioned in the breech block.

A preferred form of probe for use in this invention is shown in FIG. 2. The objective here is to provide a probe which will develop a dependable relationship of subsurface compaction to permit volumetric displacement of the probe to be divided by the input energy, preferably factored by the hardness (Moh's) of the coarse aggregate material of the concrete, thus providing a value which can be correlated to pounds per square inch compressive strength of the concrete. The probe here shown has a generally cylindrical main portion 23 which in one form of this invention is about 1-¾ inches long and little over or under three-tenths of an inch in diameter. The penetrating nose portion 24 is of a lesser diameter than the main portion and preferably about 75 to 90 percent of the diameter of the main portion. The nose portion has a conical tip 24a having an included angle preferably about 120° but which may vary between 60° and 135° An annular frusto-conical portion 25 connects the nose portion with the main portion. This portion 25 flares outwardly at an angle between about 7° and about 60° to the axis of the probe. This portion 25 is necessary to create a mechanical/chemical bond of crushed concrete material to portion 25 to prevent rebound of the probe after its driving force is depleted. A driving portion is connected to the main portion in a rigid but removable manner such as the cap 26 threaded to the main portion 23. The angle 27 is not critical. An O-ring seal 28 is provided on the driving portion of the probe to give a gas sealing fit in the bore 11a of the barrel 11. This probe is indicated generally at 30 in FIG. 1. It is necessary for 26 or 60' in FIG. 13 to be a separable member for removal of templates shown in FIG. 3 and use of the gauge plates of FIGS. 7 and 9.

Theoretically, a flat nose portion on the probe at right angles to the axis of the probe would provide the most accurate and consistent compression of displaced material. However, while this may hold true in homogeneous materials it is self-defeating in conglomeritic materials as concrete. Thus the provision on tip 24a is an optimum of 120° included angle to provide greater cracking ability when coarse aggregate is contacted in the concrete. It is a necessary part of this invention to break coarse aggregate and force the broken portions radially into the mass to form a compaction bulb of compression stressed concrete and a subsequent bond of crushed material to portion 25. The presence and/or type of coarse aggregate has a minimal effect on the probes of FIGS. 2 and 13, but the hardness of the coarse aggregate has a relationship to cracking resistance and friction. The hardness thereof is thus a factor in equating energy depletion and distance to pounds per square inch compressive strength. The probe is preferably of hardened steel.

Preferably a template 31 is utilized when driving the probes into the concrete 32. Shown here is a hardened steel plate 31a to which is firmly attached three upstanding bosses 33 and the height of each boss and the length of barrel 11 are so chosen that the housing 10 must be telescoped downwardly over the boss in the position of FIG. 1 in order to depress the barrel 11 sufficiently to cause the cocking rod 19 to position the firing pin pawl 18 in the position of FIG. 1 where it is adapted to be actuated by the trigger 20. This is a safety arrangement wherebythe discharge end of the barrel is completely housed within the housing 10 at the time that the probe is driven into the concrete by the powder firing mechanism. A through opening 34 through the boss and template permits the probe 30 to be driven into the concrete as described. The opening 34 through which probe 30 passes is larger than the probe shank diameter but substantially smaller than the diameter of 26, FIG. 2, or driving head 60, FIG. 12, or 60', FIG. 13, to prevent escape of the probe in the event the system is operated against soft materials not dense enough to stop the travel of the probe. In other words, it cannot go into free flight. Welded to plate 31a and extending downwardly under each boss 33, is a boss 33a having a central recess 33b. These bosses 33a support the template generally parallel to a plane surface of concrete to be tested in case of slight unevenness in that surface. The recess 33b permits penetration of the probe while holding the surface of the concrete under compression at the time of firing the probe, and providing clearance for erupted surface material caused by shear failure. It minimizes spalling of the concrete.

In carrying out this invention, it is preferred to drive at least three probes in a given test to permit discounting of a possible extreme variation in the event of a probe striking a reinforcing bar or striking a large particle of aggregate immediately under the surface. The three bosses 33 in the template 31 are located between about 5-½ and about 8 inches apart, sufficient to prevent overlap of adjacent stress areas caused by the probe. It is believed that the probes driven into the concrete should never be placed closer than about 17 to 20 probe shank diameters from each other. An overlap of the stress area between probes could occur and result in misleading ad inaccurate readings in carrying out this invention. A central opening 35 in the plate 31a may be utilized as later described to fasten the template to the concrete in carrying out the test method of this invention, if the resilient probe guides are insufficient.

Figure 4:
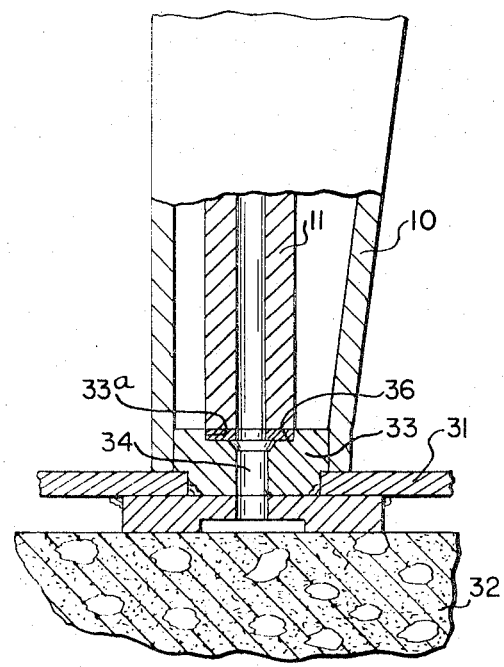
FIG. 4 is a fragmental elevational view partly in section similar to the lower portion of FIG. 1 and showing the use of a register gauge disk used in one aspect of this invention.
Figure 5:
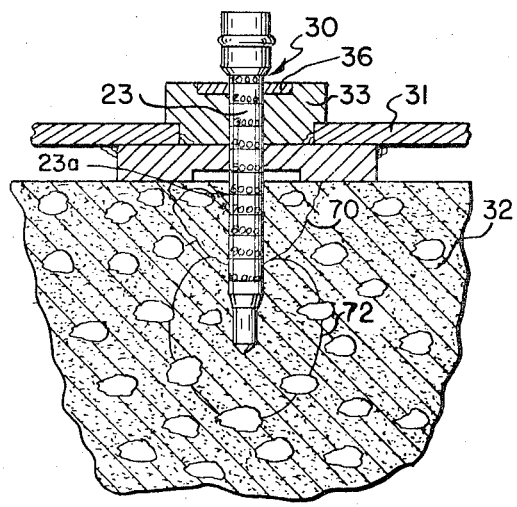
FIG. 5 is a fragmental sectional view showing a probe driven into concrete using the template of this invention and using the gauge disk to register the amount of penetration of the probe into the concrete, and the approximate resultant compaction bulb near the nose of the probe.

After driving the probe 30 into the concrete to be tested as hereinabove described in connection with FIGS. 1, 2 and 3, it is necessary to determine the depth of penetration of the probe into the concrete so that the displaced volume may be determined. In FIGS. 4 and 5, this is determined by the use of a gauge disk 36. In FIG. 4, the gauge disk is first fitted snugly into a recess 33a in the upper face of the boss 33. The probe 30 is then fired as previously described and finishes up in a portion in the concrete 32 as shown in FIG. 5. The central opening of the gauge disk 36 is a drive fit on the main portion 23 of the probe 30. Preferably, but not necessarily, the main portion is provided with indicia 23a so that a direct reading may be obtained when the probe 30 is removed from the boss 33, moving from the position of the parts shown in FIG. 5, the gauge disk 36 is firmly secured to the main portion 23 of the probe. Preferably, the indicia 23a are calibrated in terms of pounds per square inch of compressive strength of the concrete so that a direct reading may be obtained.

Another device for determining the measurement of the displaced volume of concrete is illustrated in FIG.

Figure 6:
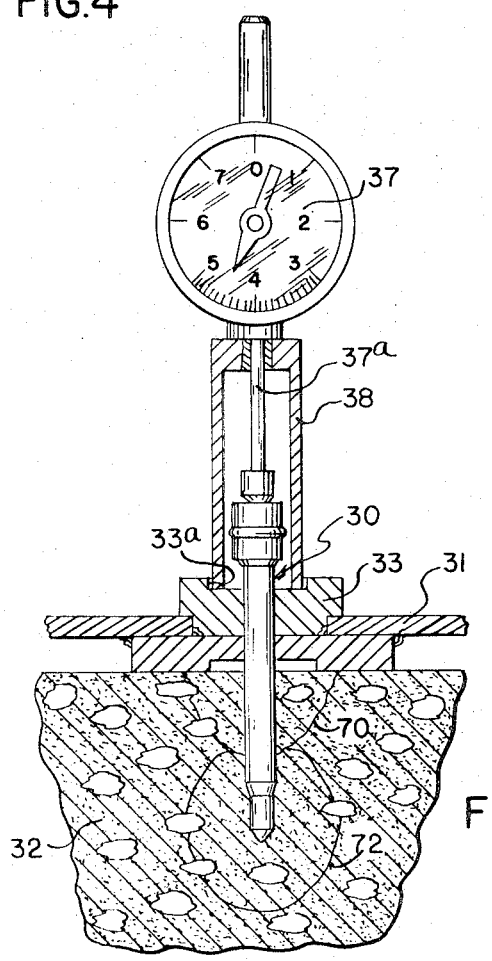
FIG. 6 is a fragmental sectional view showing another device for measuring the amount of penetration of a probe into the concrete when utilizing this invention.

6 Here the probe 30 has been driven into the concrete 32 as previously described A dial indicator 37 is equipped with a sleeve or shroud 38 surrounding th portion of the penetrator projecting ouwardly from the concrete. The lower end of the shroud is placed flat on the recess 33a of the boss 33 whereupon a feeler 37a of the indicator strikes the upper end of the probe 30 and actuates the dial pointer as illustrated in FIG. 6. This dial may be calibrated directly in pounds per square inch of compressive strength of the concrete to eliminate calculation. Assume also that using the template 31a, two probes indicated approximately 5,000 pounds per square inch but one indicated 10,000 pounds per square inch. The odd probe value, either high or low relative to the other two, would then be discounted.

Another manner of utilizing this invention is illustrated in FIGS. 7 and 8. Here the physical condition resulting from the impact of the blow driving the probe device against the concrete to be tested is the reduction in length of a crusher capsule which is provided as one of a series of force transmitting parts through which the driving force of the gun is delivered to the probe.

Referring to FIG. 8, the probe 30' has a main portion 40 and a drive portion 41 of greater diameter than the main portion. The drive portion has a bore 41a into which the cylindrical rear end of the main portion 40 fits telescopically. A chamber 42

Another manner of measuring average penetration where three probes are driven, as discussed in FIG. 3, is illustrated in FIGS. 7 through 11. It will be noted that the base gauge plate shown in FIG. 7 and the top gauge plate shown in FIG. 9 are of approximately the same size and shape as the template 31 previously described. The base gauge plate 45 has three through openings 46 near corners of the generally triangular plate. In the center of the plate is a circle 50' which is approximately three-sixteenths inches in diameter and whose purpose is later described. The plate has sides of approximately equal length and midway of each side on the underface thereof is a small button 47 projecting downwardly from the plate 45 for not less than three thirty-seconds of an inch. When the plate 45 rests upon the concrete 32 being tested as shown in FIG. 8, the purpose of the three buttons 47 is to space the plate 45 sufficiently to clear slight inequalities in the concrete.

The top gauge plate 48, shown in FIG. 9, is the same size and shape as the plate shown in FIG. 7 and has three recessed buttons 49 projecting from the underside of this plate in use, the spacing of these buttons at their centers being exactly correspondent to the centers of the holes 46 of FIG. 7. The buttons 49 in this form of the invention are approximately nineteen thirty-seconds in diameter and approximately ¼ inch projection from the plate 48. Referring to FIG. 10, each button 49 has a central concentric recess 49a opening downwardly to receive the upper end of a probe which has been driven into the concrete 32. Located approximately equidistant from the three buttons 49 and directly above circle 50' on the base gauge plate is a central through opening 50 in plate 48 about fifteen sixty-fourths inches in diameter through which the measuring rod of FIG. 11 is introduced. Preferably, but not necessarily, an elongated through opening 51 is provided in plate 48 for ease in handling.

The use of the gauge plates of FIGS. 7 and 9 will now be described. After three probes 30 have been driven into the concrete 32 by the means previously described and utilizing the template 31, the separable driver heads are removed, the base gauge plate 45 is first slipped over the three probes which pass through the holes 46 and the plate rests on a generally plane portion of the concrete 32 by means of the three buttons 47 previously described. This places the plate 45 generally parallel to the slightly uneven surface of the concrete 32. On the threaded upper end of each probe 30 at 26 there is screwed down a hollow cap 52 inside of which is a helical spring 53 held between the associated cap 52 and plate 45. The top gauge plate 48 is then placed with the recesses 49a of the buttons 49 receiving the upper ends of the three probes 30. The central portion of plate 48 then represents an average height of the tops of the three probes 30 with reference to the concrete 32. The measuring device of FIG. 11 is then brougnt into play. This device comprises a cylindrical guide 54 slidably encased in a cylinder 55, the upper end of which is closed with a screw plug 56 holding a helical spring 57 in compression between the plug and the cylindrical member 54. The cylindrical member has a measuring extension or measuring gauge rod 54a of a diameter adapted to pass snugly but slidably through the opening 50 of the plate 48. The nose of this extension is tapered to about 1/16 inch diameter at the bottom. A set screw 58 is provided threaded through the wall of cylinder 55 to engage the cylindrical guide member 54 and hold it in an exact position when the measurement is made. The member 54a of FIG. 11 is then placed through the opening 50 of plate 48 and with its lower end engaging plate 45 as shown in dot-dash lines of FIG. 10. If probe penetration is uneven, as between the three probes, the extension 54a will incline from the vertical. If the lower end or nose of this extension lies outside of circle 50', then the test should be repeated because one probe has encountered an unusual local condition. This feature allows for a deviation from the vertical of three-sixteenths inches in a 1-½ inch vertical height or about 10° at 3,500 p.s.i. This diameter of circle 50' will detect a coefficient of variation if greater than three percent for a given set of three probes. This technique provides simplicity for field use. The set screw 58 is then positioned to hold the measuring portion 54a in such fixed position, after which the projection of the member 54a may be measured which will give exact measurement, as shown in FIG. 10, between the top of plate 45 and the top of plate 48 in the midportion of these plates. A corrective factor is included to allow for the thickness of plate 45 and button 47 at the bottom and also to allow for the thickness of plate 48 and the thickness of each button 49 resting on top of each probe 30 and marked A in FIG. 10. The net figure than arrived at will measure the average exposed length of each probe 30 above the surface of the concrete 32 which by subtraction will give the penetration of the bottom of each probe into the concrete 32 from which the compressive strength of the concrete can be determined as previously set forth herein.

Figure 12:
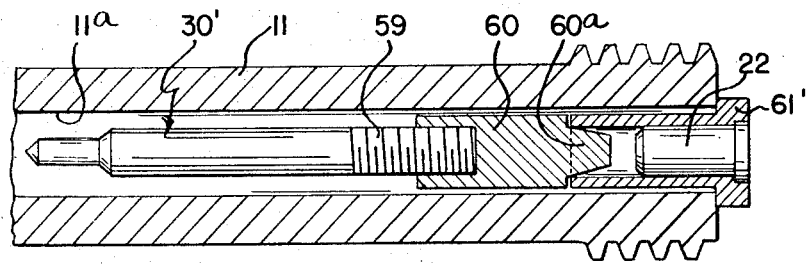
FIG. 12 is a central sectional view through a portion of the gun barrel of FIG. 1 and through a probe similar to that shown in FIG. 2 but providing a frictional grip on the probe until the powder charge has developed its full force.

The modified probe of FIG. 12 is for the purpose of insuring a uniform distance between cartridge 22 and driving head 60 and also for insuring that the powder charge develops its full force before the probe starts down the barrel 11 of the powder actuated firing device shown in FIG. 1. The main body of the probe 30' is necessarily like that previously described having its driving end threaded as shown at 59. A cap member or driving head 60 is threaded onto the threads 59 before fixing the probe in the powder actuated device. The head 60 has a truncated cone projection 60a. A detachable breech plug 61' which is a slight modification of the detachable breech plug 61 shown in FIG. 1, which is insertable into or removable from the barrel and adapted to hold the cartridge 22, is adapted to grip the projection 60a with slight friction grip in the position of the parts shown in FIG. 12. In use of the probe 30' of FIG. 12, the parts are positioned as shown in that drawing in the upper end of the barrel 11 in a position similar to that shown in FIG. 1 and the cartridge 22 is positioned in the detachable breech plug 61'. The clearance between head 60 and the bore 11a of the barrel is carefully controlled and is preferably between 0.00025 and 0.00075 inches with both diameters true and uniform their entire length. When the cartridge is fired, the friction between the parts 61' and 60a is sufficient to hold the probe against the plug 61' until the cartridge has developed a major portion of its potential to drive the probe. This improvement, shown in FIG. 12, insures that the full force of the predetermined charge in the cartridge 22 is fully applied to the probe 30' in driving the same into the concrete rather than having the probe prematurely leave the plug 61' before the full force of the charge is exerted upon it.

Figure 14:
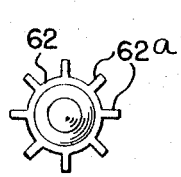
FIG. 14 is an end view of the probe of FIG. 13 taken at the left-hand end thereof.
Figure 13:
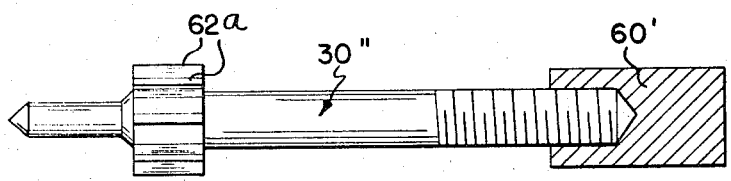
FIG. 13 is a view similar to the probe of FIG. 12 but showing a modification.

Another arrangement for maintaining a controlled distance between the cartridge 22 and the driving head of the probe is shown in FIGS. 13 and 14. A driving head 60' is threaded on the inner end of the probe 30' and this is intended to have a slight clearance with the barrel bore 11a as described in connection with FIG. 12. Here the means for insuring a controlled distance between the driving head 60' and the cartridge 22 is a resilient plastic sleeve 62 having radially outwardly extending fins 62a which are of a length to frictionally engage the bore 11a of the barrel 11 when the probe is placed in the barrel prior to firing the cartridge 22. In one form of this device, the friction of the fins 62a against the barrel bore will withstand a static load of 5 pounds so that the position of the probe in the barrel does not shift during normal handling. In use of the device shown at 62, 62a, the probe is twisted as it is inserted into the barrel so that all of the fins 22a twist in the same direction.

Figure 15:
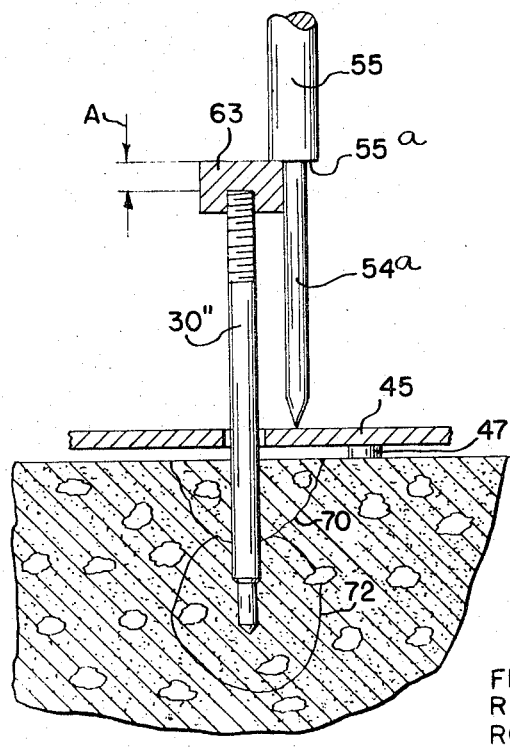
FIG. 15 is a sectional view of a single probe driven into the concrete with a portion of a gauge base plate like FIG. 7 and the measuring device of FIG. 11 in position to measure depth of penetration.
Figure 17:
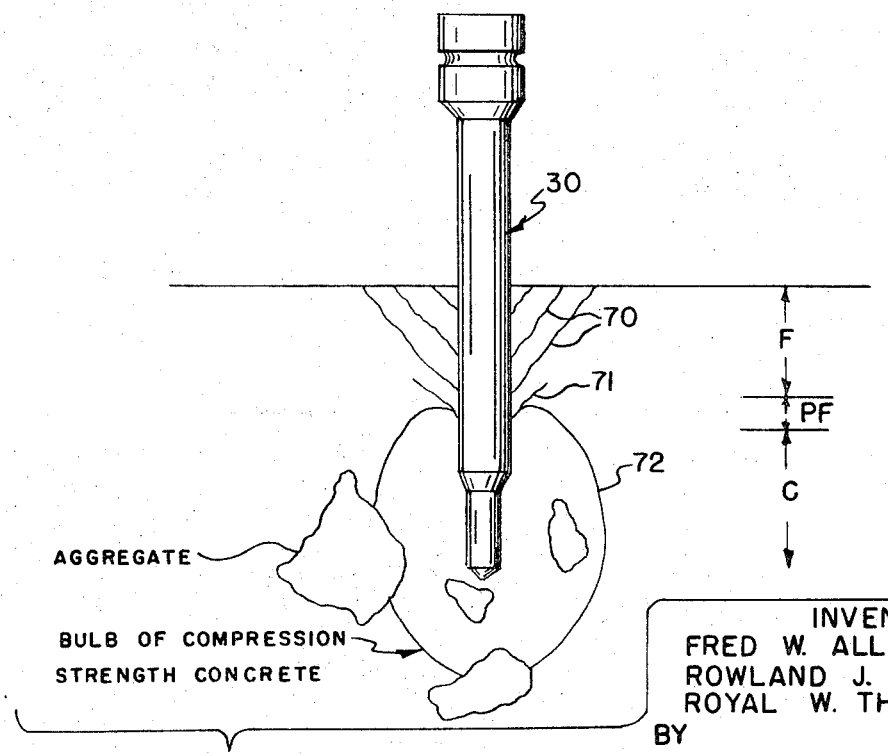

Sometimes a single test of concrete strength is desirable in order to determine when to strip forms. In such cases, a plurality of probes need not be driven as explained in connection with FIGS. 3, 7, 9 and 10. FIG. 17 shows a single probe 30'' driven into the concrete 32. The driving head 60' has been removed and the base gauge plate 45 has been placed on the concrete resting on the buttons 47 as previously described. A measuring cap 63 has been threaded on the upper end of the probe 30'' and this cap is preferably arranged with a thickness of metal between the upper surface of the cap and the upper end of the probe indicated as A which is identical with the same dimension shown in FIG. 10. The measuring device 55 of FIG. 11 is then positioned as shown in FIG. 15 with the shoulder 55a resting upon the upper surface of the measuring cap 63. The elongation of the measuring extension 54a will then give a reading coordinated with the readings taken as described in connection with FIG. 10 inasmuch as corrections for the thicknesses 45 and 47 at the bottom and the dimension A at the top are the same.

To obtain the most exact and dependable readings in the use of this invention, attention must be made to the following points:

1. The powder charge must be a carefully controlled mixture and an exactly measured (weight) and is preferably held in the cartridge shell by a wadding firmly tamped in place so that as the gun is turned at different angles, the powder charge remains fixed in position in the cartridge shell.

2. The probe for any given set of tests must be of controlled physical specifications expecially the hardness wherein 50 Rockwell C is the preferred minimum and 54 Rockwell C maximum. Preferably the diameter of the probe is held to plus or minus 0.001 inches. The conformation of the pointed end of the probe must be uniform for any given set of tests.

3. The clearance between the driving head of the probe and the bore of the gun should be carefully controlled and uniform for a given set of tests. Preferably the radial clearance is between 0.00025 and 0.00075 inches.

4. The diameter of the driving head of the probe and the barrel of the gun should be uniform throughout the entire length.

5. The length of the cartridge shell and of the breech plug should be carefully controlled.

6. The initial position of the probe relative to the breech plug and the cartridge should be carefully controlled. This may be done as taught in connection with FIG. 12 or a preferred form is shown in FIG. 13.

7. The use of a plurality of probes, such as three, is more dependable than that of a single probe. The use of the gauge plates of FIGS. 7 and 9 as a means of taking a measurement as indicated in FIG. 10 give dependable results. Deviation from the vertical of the measuring rod 54a with respect to the check circle 50' on base gauge plate in FIG. 7 should be followed as an indication that one of the probes varies too much from the others, and the coefficient of variation of the three probes exceeds three percent.

Figure 16:
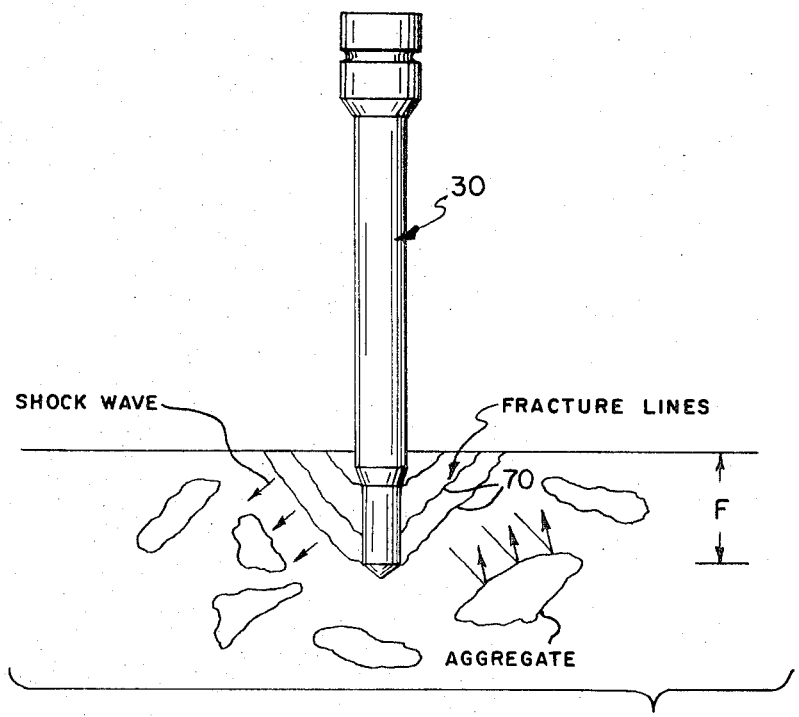
FIG. 16 is a diagrammatic view showing a partially driven probe which has passed through zones of fracture and of partial failure of the concrete.

The theory underlying the test of this invention is believed to be as follows. Under the impact of the probe, as shown in FIGS. 16 and 17, a stress wave travels through and tends to compress the concrete. This compression is unable to create room for the probe and the material is crushed around the penetrating end. The stress at the surface of the probe reaches the compressive strength of the concrete and failure occurs.

When the probe has penetrated through a zone F, a fracture is propogated upwards until it reaches the surface of the material at which time a shear failure cone of material shown in wavy lines 70 in FIG. 16 becomes loose, although not displaced due to the pre-load of the locating template 33a surrounding the point of entry. This is called the spall area.

The fracture process is continued until in zone PF (FIG. 17) one of the fractures 71 does not reach the surface of the material. At this stage material ceases to become loose but internal cracks exist. Finally, in zone C the stress is reduced to the extent that a new crack cannot be initiated, but enough energy is still available to crush the material around the probe. Penetration continues, energy is being depleted by the continuous crushing and surface friction until, finally, penetration stops. The resulting zone of penetration C results in a compression stressed bulb 72.

Stress in zone F is zero. Material has failed and thus stress is relieved. This is the spall area and does not contribute to preventing the probe from rebounding.

Stress in zone PF is partial — the amount is uncertain. Perhaps portions approach ultimate shear strength because cracks do nucleate.

Stress in zone C is created by compressive stresses set up by crushed material around the probe shank and the bulb 72 of the compression stressed concrete surrounding that, as shown in FIG. 17, is the main contributor to preventing the probe from rebounding.

The bulb of compression stressed concrete is inversely proportional to the compressive strength of the concrete. It is the resistance to penetration caused by the cracked aggregate against the mortar that determined the time and distance required to absorb the constant input energy of the probe. Thus high compressive strength concrete will cause short probe penetration and low strength will accept deeper penetration. The exposed sections of the probes provide measurements for correlation to p.s.i.

Stress waves analyzed during this study determined the recommended spacing of probes to prevent overlap of compression zones.

Probes should not be driven closer than 17 to 20 times its maximum diameter ($d$) or closer than 12 to 15 times ($d$) from the unsupported edge of concrete.

FIG. 18 shows how the above test may be made more accurate by factoring in the hardness of the aggregate using Moh's Hardness Scale. Concrete is defined as a hard, solid mass made from a mixture of sand, cement and aggregate, the latter being crushed stone, rock, gravel and the like. It has been determined that the hardness of the aggregate affects the compressive strength of the concrete. Moh's Scale is expressed in a series of steps running from Talc 1 to Diamond 10. Hardness of the different steps is determined by the fact that any member in the series will scratch any of the preceding members. Moh's Hardness members at the right of FIG. 18 are listed as Calcite 3, fluorspar 4, apatite 5, orthoclase 6, and quartz 7. Scratch hardness pencils or mineral sets are inexpensive and simple to use. The hardness of commonly used aggregates is well known, such as some limestone is 3 and traprock is 6. In using FIG. 18, the exposed probe length in inches is found at the left side of the graph and followed horizontally to the proper aggregate hardness line, and the intersection will give a corrected value of the compressive strength of the concrete at the bottom of the chart. The overall length of the probe used in preparing the graph of FIG. 18 was 3.125 inches. In other words the ordinates marked "exposed probe inches" are complementary to "probe penetration inches". For instance, the ordinate value 2.100 is complementary to 1.025 inches of probe penetration into the concrete. A chart similar to FIG. 18 would normally be prepared for any particular probe length being used. it is obvious that a table of values might replace the chart of FIG. 18. FIG. 18 was prepared by driving a large number of probes, measuring the depth of penetration of the probe into the tested concrete, and determining the compressive strength of the concrete in each instance by known methods of testing including casting cylinders of the concrete material and extracting cores from the concrete material in situ, which cylinders and cores were checked by standard methods.

This invention provides a very simple arrangement for testing concrete in situ after pouring without the difficulties encountered in previously known methods of testing. It does not require the pouring of special test samples with resultant variation between the samples and the actual concrete poured on the job. Neither does it call for the destructive cutting of cores from the finished concrete, and the inherent problems in drilling, and squaring, soaking and embedded steel.

It should be noted that this invention is not a measurement of the surface hardness of a homogeneous metal, but, instead, it measures compression strength of a conglomerate material by depth of probe penetration to a subsurface zone.

What is claimed is:

1. The method of determining the compressive strength of concrete composed of a mixture of sand, cement, and aggregate, comprising driving a large number of investigative probes into a plurality of series of set concrete samples at various times after setting to a depth below a shear failure cone, all samples of a given series using the same aggregate of a known hardness, cracking the coarse aggregate by driving the probes, using generally cylindrical probes with a penetrating nose portion having a conical tip whose included angle is between 60° and 135° and using a powder charge to drive said probes through a gun barrel, all of said probes being of substantially uniform physical dimensions and structure, all of said powder charges being uniform in composition and weight with the explosive force of said charge uniformly applied to the driven probe, measuring the exposed length of said investigative probes, calibrating the exposed length of said investigative probes in terms of compressive strength of the concrete by associating the penetration of each of the probes with an independent measurement of the compressive strength of each of the respective samples tested by a standard testing procedure such as cutting a test core from the concrete sample adjacent the investigative probe or casting a test cylinder at the time of pouring the concrete sample tested and then crushing said test cores and cylinders using accepted procedures and recording the compressive strength of each concrete sample so determined with the exposed length of the associated investigative probe, the record for each series of samples being separated according to aggregate hardness, then driving a test probe into an unknown concrete sample in which the aggregate hardness is known to a depth below a shear failure cone, the test probe and driving conditions being held substantially exactly the same as in the case of driving said investigative probes, measuring the exposed length of said test probe, and the compressive strength of the unknown concrete sample then obtained by using the calibration of an investigative probe having the same exposed length as the test probe in the unknown sample when driven in the same manner into concrete in which the same aggregate occurs of the said known hardness.

2. The method of claim 1, including the step of driving a plurality of said test probes in a common area of concrete to be tested separated sufficiently so that their shear failure cones do not intersect, and using the average of consistent mechanical measurements of the penetration of said probes as determining the compressive strength of said concrete.

3. The method of claim 2, including placing a gauging plate arrangement across the free ends of said plurality of probes and making said measurement and mechanical computation, of the coefficient of variation limit of the set of probes embedded, from a central spot of said plate.

4. The method of determining the compressive strength of concrete composed of a mixture of sand, cement and aggregate, comprising driving a large number of investigative probes into a plurality of series of set concrete samples at various times after setting, each series having the same type of aggregate of substantially uniform hardness, performing a scratch test for hardness of various aggregate found in said samples and segregating records thereof according to aggregate hardness, cracking the coarse aggregate by driving the probes using generally cylindrical probes with a penetrating portion having a conical tip whose included angles is between 60° and 135° followed by an outwardly flaring portion preventing rebound of a driven probe, and using a powder charge to drive said probes through a gun barrel, all of said probes being of substantially uniform physical dimensions and structure, all of said powder charges being uniform in composition and weight with the explosive force of said charge uniformly applied to the driven probe, measuring the exposed length of said investigative probes, calibrating the exposed length of said investigative probes segregated in series according to aggregate hardness in terms of compressive strength of the concrete by associating the penetration of each of the probes with an independent measurement of the compressive strength of each of the respective samples tested using standard testing procedures, recording the compressive strength of each concrete sample so determined with the exposed length of the associated investigative probe segregated according to aggregate hardness, then driving a test probe into an unknown concrete sample in which the aggregate hardness is correlated with said above mentioned scratch test hardness, the test probe and driving conditions being held substantially exactly the same as in the case of driving said investigative probes, measuring the exposed length of said test probe, and the compressive strength of the unknown concrete sample then obtained by using the previously prepared calibration of an investigative probe, having the same exposed length as the test probe in the unknown sample, when driven into concrete in which the same aggregate occurs of the said known hardness.

5. The combination of a powder actuated device comprising a barrel having a bore having a breech for holding a powder filled cartridge at one end which is adapted to be fired to drive a testing probe out the nose of the barrel into concrete to be tested, a firing template for placement on said concrete, a boss on the upper side of said template to receive and center said nose of said barrel, there being an opening through said template centrally of said boss, a probe having an elongated generally cylindrical body having a pointed nose at one end toward said barrel nose and a separable driving head at the other end toward said breech, said template boss central opening permitting passage of said probe body but preventing passage of said driving head, and removable resilient fins extending radially outwardly from the body of said probe, said fins of a length and height to frictionally engage the bore of said barrel, and said resilient fins slidably removable by stripping during passage through said template boss central opening.

6. In a powder actuted firing device having housing with a bore open at the front end and having a breech block in said bore secured to a barrel therein, and means mounting said breech block and housing permitting relative axial movement therebetween in said bore, and having a firing pin in said housing behind said breech block movable toward and from a firing pin hole in actuated breech block, and having means for cocking said firing pin responsive to predetermined relative movement between said housing and said breech block and the connected barrel, and having means for releasing said firing pin when cocked, and wherein said predetermined relative movement requires movement of the front end of said barrel into said housing a predetermined distance; the combination therewith of a firing template for use with its bottom resting on a piece of concrete to be tested by firing a probe thereinto, said probe having a driving head at its upstream end of larger diameter than the probe, said template having a boss on the upper side thereof, there being a through opening centrally of said boss and passing through said template of a size to permit passage of said probe, but smaller in diameter than said separable driving head to prevent escape into free flight under abnormal conditions; said boss having a perimeter permitting the open front end of said housing to telescope thereover, and said boss having a height to cause said barrel to enter into said housing said predetermined distance only when said housing is telescoped over said boss.

7. The combination of claim 6, wherein said template has a plurality of said bosses on its upper surface arranged in a pattern such as to prevent overlapping of the stress areas when a plurality of probes are fired into a piece of concrete.

8. The combination of claim 6, including a gauge disk having a perimeter adapted to be embraced in said template boss, and there being a central opening through said disk of a size to be press fitted on a passing probe for measurement of penetration of a probe passed therethrough.

9. A probe for use in testing the compressive strength of concrete by firing the same into a concrete sample using a powder actuated firing device, said probe having a generally cylindrical main portion and a nose portion of lesser diameter between about 75 percent and 90 percent of the diameter of the main body portion, said nose portion having a conical tip with an included angle between about 60° and about 135°, there being an annular frustoconical connector portion between said nose portion and said main portion flaring outwardly between about 7° and about 60° from the vertical and said nose portion having a length about once or twice its diameter.

10. A probe as defined in claim 9, having a generally cylindrical drive portion at the end opposite said nose portion, said drive portion being of greater diameter than said main portion and carrying separable annular means for sealing said drive portion in the bore of a powder actuated device.

11. The method of performing a dependably reproducible test for the compressive strength of concrete composed of a mixture of sand, cement and an aggregate of known hardness, any time after setting with commercially acceptable accuracy, comprising driving a number of investigative probes into a plurality of series of concrete samples at various times after setting, all samples of a given series using the same aggregate of a known hardness, calibrating the exposed lengths of said investigative probes segregated in series according to aggregate hardness in terms of compressive strength of the concrete as checked by an independent measurement of the compressive strength of the respective samples using standard testing procedures, and recording the respective strengths of said samples coordinated with the exposed lengths of the associated probes segregated according to aggregate hardness, all of said probes being driven by means of a powder actuated firing device having a barrel with an open-ended bore, each of said probes being an elongated metal probe having a driving head and having a penetrating nose portion including a conical point with a fixed angle between 60° to 135° capable of cracking pieces of coarse aggregate; in every such test using (1) a probe of substantially uniform physical dimensions and structure, (2) a powder charge of a carefully controlled mixture and exactly measured weight, (3) a substantially uniform spacing of the open end of said barrel close to the surface of the concrete, (4) a substantially uniform initial position of the probe relative to the powder charge in a zone in the barrel spaced from the surface of the concrete to be tested, and (5) a substantially uniform clearance between the driving head of said probe and the bore of said barrel; the powder charge being sufficient to drive each said probe below a shear failure cone in said concrete and to cause the probe to crack the coarse aggregate in the concrete; and thereafter driving a test probe into an unknown concrete sample whose aggregate hardness is known and keeping all conditions uniform with those under which the investigative probes were driven, then measuring the exposed length of said test probe as giving a measure complementary to the depth of penetration to determine the compressive strength of the concrete tested, by using said recorded calibration of an identical probe driven under the same conditions into concrete, whose aggregate is of the same hardness.

* * * * *